United States Patent
Ekbatani

(10) Patent No.: US 9,167,385 B2
(45) Date of Patent: Oct. 20, 2015

(54) METHOD AND APPARATUS FOR RANGING USING CHANNEL ESTIMATION WITH INTERFERENCE REJECTION

(71) Applicant: QUALCOMM Incorporated, San Diego, CA (US)

(72) Inventor: Siavash Ekbatani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 37 days.

(21) Appl. No.: 14/083,150

(22) Filed: Nov. 18, 2013

(65) Prior Publication Data

US 2015/0141034 A1    May 21, 2015

(51) Int. Cl.
- H04W 24/00  (2009.01)
- H04W 4/02   (2009.01)
- H04L 25/02  (2006.01)
- H04L 25/03  (2006.01)
- H04W 64/00  (2009.01)

(52) U.S. Cl.
CPC ............... *H04W 4/023* (2013.01); *H04L 25/02* (2013.01); *H04L 25/0204* (2013.01); *H04L 25/03821* (2013.01); *H04W 64/00* (2013.01)

(58) Field of Classification Search
CPC .............. H04W 4/023; H04L 25/0204; H04L 25/03821; H04L 25/02
USPC ......... 455/456.1, 456.2, 456.3, 450, 501, 507
See application file for complete search history.

(56) References Cited

U.S. PATENT DOCUMENTS

| | | | |
|---|---|---|---|
| 7,400,609 B2 | 7/2008 | Hammerschmidt | |
| 8,340,072 B2 | 12/2012 | Ma et al. | |
| 2009/0209260 A1* | 8/2009 | Lee et al. | 455/445 |
| 2009/0247157 A1* | 10/2009 | Yoon et al. | 455/434 |
| 2010/0046491 A1 | 2/2010 | Vermani et al. | |
| 2010/0165942 A1* | 7/2010 | Liao et al. | 370/329 |
| 2010/0271263 A1 | 10/2010 | Moshfeghi | |

(Continued)

FOREIGN PATENT DOCUMENTS

EP    0865172 A2    9/1998

OTHER PUBLICATIONS

International Search Report and Written Opinion—PCT/US2014/059484—ISA/EPO—Jan. 20, 2015.

(Continued)

*Primary Examiner* — Khai M Nguyen
(74) *Attorney, Agent, or Firm* — Silicon Valley Patent Group LLP

(57) ABSTRACT

A ranging procedure is performed using interference cancellation using preamble messages from a plurality of objects, each of which includes a pre-defined orthogonal design coded modulation patterns. A channel for an object may be estimated using the pre-defined orthogonal design coded modulation patterns in the preamble messages received from objects to remove interference of the preamble message received from other objects. A range to an object may be determined based on a determined delay in the preamble message from that object. The range may be used to assist in determining the position of the object. The pre-defined preamble message may be transmitted by receiving a schedule for an access point in a network for a ranging procedure and periodically transmitting a pre-defined preamble message for the ranging procedure, the pre-defined preamble message includes an orthogonal design coded modulation pattern.

28 Claims, 4 Drawing Sheets

(56) References Cited

U.S. PATENT DOCUMENTS

| | | |
|---|---|---|
| 2011/0124347 A1 | 5/2011 | Chen et al. |
| 2011/0221635 A1* | 9/2011 | Wang .......................... 342/463 |
| 2014/0016511 A1* | 1/2014 | Segev et al. .................. 370/255 |

OTHER PUBLICATIONS

Staudinger E, et al.,"A Generic OFDM Based TDoA Positioning Testbed with Interference Mitigation for Subsample Delay Estimation", Multi-Carrier Systems & Solutions (MC-SS), 2011 8th International Workshop on, IEEE, May 3, 2011, pp. 1-5, XP031947900, DOI: 10.1109/MC-SS.2011.5910707, ISBN: 978-1-61284-885-3.

Yang J et al., "A Novel First Arriving Path Detection Algorithm Using Multipath Interference Cancellation in Indoor Environments", 2010 IEEE 72nd Vehicular Technology Conference Fall (VTC 2010-Fall), Sep. 1, 2010, pp. 1-5, XP055161366, DOI: 10.1109/VETECF.2010.5594111, ISBN 978-1-4244-3573-9.

* cited by examiner

METHOD AND APPARATUS FOR RANGING USING CHANNEL ESTIMATION WITH INTERFERENCE REJECTION

BACKGROUND

1. Background Field

The present invention relates generally to localization of objects and more particular, to ranging of multiple objects using channel estimation.

2. Relevant Background

Location Based Services (LBS) often use satellite based positioning systems, such as the well-known Global Positioning System. For indoor locations, however, satellite based positioning systems, are problematic due to poor signal reception as well as relatively poor resolution. For example, when a satellite based positioning system is used for localization in an indoor environment, the resolution of a few meters that may be achieved with satellite based positioning systems may result in an object being located in an incorrect room.

Typically, when tracking objects or persons in indoor environments, resolution that is superior to that achieved by satellite based positioning systems is desirable. Ranging to access points in the Gigahertz bandwidth range may be used to achieve desired resolutions in indoor environments. Ranging to access points, however, may require the temporary suspension of transmission from access points, such as WiFi™ Thus, it may be desirable to search for multiple objects simultaneously when ranging to access points to reduce amount of time of the suspension of transmission from the access points. Accordingly, it is desirable if multiple objects can communicate with the access points simultaneously. Unfortunately, interference between signals broadcasted by objects being tracked may be problematic with respect to channel estimation, which is necessary to identify which signals are associated with which object.

SUMMARY

A ranging procedure is performed using interference cancellation using preamble messages from a plurality of objects, each of which includes a pre-defined orthogonal design coded modulation patterns. A channel for an object may be estimated using the pre-defined orthogonal design coded modulation patterns in the preamble messages received from objects to remove interference of the preamble message received from other objects. A range to an object may be determined based on a determined delay in the preamble message from that object. The range may be used to assist in determining the position of the object. The pre-defined preamble message may be transmitted by receiving a schedule for an access point in a network for a ranging procedure and periodically transmitting a pre-defined preamble message for the ranging procedure, the pre-defined preamble message includes an orthogonal design coded modulation pattern.

In one embodiment, a method for performing a ranging procedure with interference cancellation, the method includes receiving preamble messages from a plurality of objects, each preamble message includes a pre-defined orthogonal design coded modulation pattern; estimating a first channel for a first object using the pre-defined orthogonal design coded modulation pattern in the preamble message received from the first object and the pre-defined orthogonal design coded modulation pattern in the preamble message received from the second object to remove interference of the preamble message received from the second object; and determining a delay in the preamble message from the first object on the first channel to determine a range to the first object.

In one embodiment, an apparatus capable of performing a ranging procedure with interference cancellation, the apparatus includes a wireless interface configured to transmit to and receive signals from multiple objects; a processor coupled to control the wireless interface, the processor configured to cause the wireless interface to receive through the wireless interface preamble messages from a plurality of objects, each preamble message includes a pre-defined orthogonal design coded modulation pattern, estimate a first channel for a first object using the pre-defined orthogonal design coded modulation pattern in the preamble message received from the first object and the pre-defined orthogonal design coded modulation pattern in the preamble message received from the second object to remove interference of the preamble message received from the second object, and determine a delay in the preamble message from the first object on the first channel to determine a range to the first object.

In one embodiment, a method for transmitting a pre-defined preamble message, includes receiving a schedule for an access point in a network for a ranging procedure; and periodically transmitting a pre-defined preamble message for the ranging procedure, the pre-defined preamble message includes an orthogonal design coded modulation pattern.

In one embodiment, an apparatus capable of transmitting a pre-defined preamble message includes a wireless interface configured to transmit to and receive signals from access points; a processor coupled to control the wireless interface, the processor configured to receive through the wireless interface a schedule for an access point in a network for a ranging procedure; and to cause the wireless interface to periodically transmit a pre-defined preamble message for the ranging procedure, the pre-defined preamble message includes an orthogonal design coded modulation pattern.

DETAILED DESCRIPTION

Figure 1:
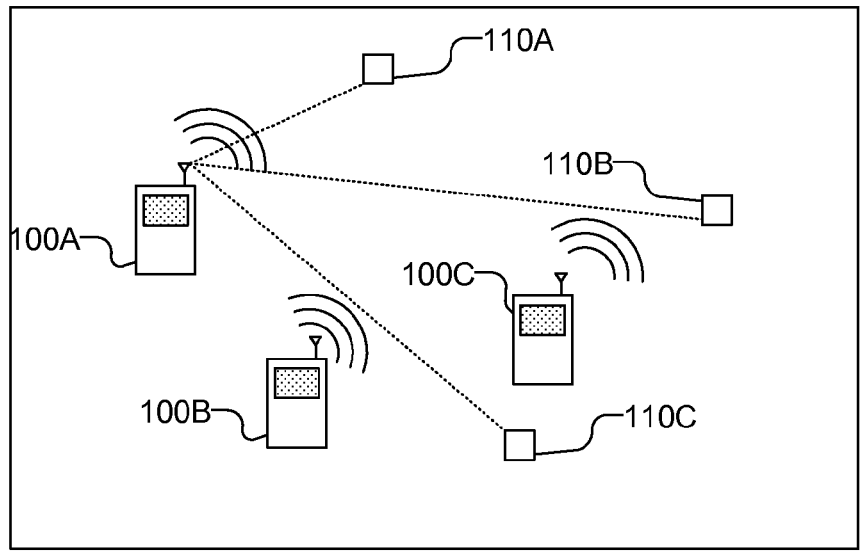
FIG. 1 illustrates an indoor Location Based Service (LBS) system in which a plurality of transmitters periodically transmit a pre-defined preamble message that includes an orthogonal design coded modulation pattern, which receivers use to cancel interference when estimating the channels of the transmitters.

FIG. 1 illustrates an indoor Location Based Service (LBS) system in which there are a plurality of transmitters 100A, 100B, 100C (collectively 100) and receivers 110A, 110B, and 110C (collectively 110). The transmitters 100 are the objects to be wireless tracked, and are, thus, sometimes referred to herein as "objects" or "objects." Each receiver 110 determines a range to each object 100, e.g., based on the round trip delay of the signals propagating between the object 100 and the receiver 110. Using a plurality of ranges, e.g., to three or more receivers 110, (along with known positions of the receivers 110), the position of each object 100 may be determined, e.g., using trilateration. For example, as illustrated in FIG. 1, the range between object 100A and receivers 110A, 110B, and 110C may be determined (as illustrated by the dotted lines) and based on these ranges and the known positions of the receivers 110A, 110B, and 110C, the position of the object 100A may be determined.

The objects 100 are illustrated in FIG. 1 as mobile platforms, but may be any portable electronic device to be tracked. The objects 100 are capable of receiving from and transmitting wireless signals to receivers 110, which may be, e.g., access points used for wireless local area network (WLAN) and may be WiFi transmission according to IEEE 802.11 standards or any other wireless standards. As used herein, the "object," "object" or "transmitters" refers to any portable electronic device to be tracked such as a cellular or other wireless communication device, personal communication system (PCS) device, personal navigation device (PND), Personal Information Manager (PIM), Personal Digital Assistant (PDA), or other suitable mobile device. The term "object," "object" or "transmitters" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "object," "object" or "transmitters" is intended to include all electronic devices, including wireless communication devices, computers, laptops, tablet computers, dedicated tracking devices, etc. capable of receiving and transmitting wireless signals as discussed herein. The receivers 110, e.g., access points, may be part of the same network, as well as an auxiliary network, e.g., if equipped with a different chipset. For example, tracked objects and access points may have two chipsets: one chipset for ultra-wideband (UWB) ranging and one chipset for synchronization. The chipset used to configure the synchronization network may have a smaller bandwidth than the UWB ranging network. The firmware and software can manage the required communications between the two chipsets. If desired, additional or different access points may serve as an auxiliary network.

The objects 100 transmit a pre-defined preamble message that includes a coded modulation pattern in response to a request from at least one receiver 110 for a ranging procedure. The coded modulation pattern is based orthogonal design and is therefore sometimes referred to herein as an orthogonal design coded modulation pattern. As illustrated in FIG. 1, the LBS system is a multi-object system, in which multiple objects are tracked simultaneously. Accordingly, in order for the LBS system to be successfully deployed, each object should be correctly identified in a noisy environment, and there can be no ambiguity between different objects. To eliminate cross-interference from other objects, each object to be tracked in the system is assigned a preamble message that includes an orthogonal design coded modulation pattern that is orthogonal to the preamble messages assigned to other objects in the system. By transmitting pre-defined preamble message that includes an orthogonal design coded modulation pattern, the range to multiple objects may be accurately determined without interference between the simultaneous transmissions signals of multiple objects.

To further clarify the pre-defined preamble messages transmitted by the objects with orthogonal design coded modulation pattern, the interference problem and proposed cancellation technique are described further.

I. Interference Problem

The first step in tracking an object indoors using ranging is to estimate the channel between the object and the access point (AP). Based on the channel estimation results, the round trip delay of signal propagation between the object-AP pair can be calculated through leading edge detection and the distance between the object and the AP estimated to provide the range.

Suppose that a system includes two objects, Object.1 and Object.2, that are both transmitting ranging preambles to an access point. It is desired to estimate the propagation channel of Object.1 for the purpose of ranging. With Fast Fourier Transform (FFT) based processing, assuming ideal sampling and without any phase noise or carrier frequency offset or sampling offset, the received signal $\bar{y}$ from Object.1 and Object.2 at the access point can be modeled as $$\bar{y} = F^H \Theta_1 F h_1 + F^H \Theta_2 F h_2 + n \qquad \text{eq. 1}$$

where F is the Fast Fourier Transform (FFT) Hermitian matrix, F is the FFT matrix, $\Theta$ is the blockwise preamble frequency response, h is the propagation channel, and the vector n is the Additive White Gaussian Noise (AWGN). With conventional processing, assuming that the frequency response of the preamble is well-conditioned (without nulls), the estimated channel of Object.1 can be obtained by $$F^H \Theta_1^{-1} F \bar{y} = \hat{h}_1 + \underbrace{F^H \Theta_1^{-1} \Theta_2 F h_2}_{\text{estimation bias}} + n'. \qquad \text{eq. 2}$$

As can be seen in equation 2, an inevitable estimation bias is present in this expression as the result of Object.2 interference. Intuitively speaking, when the preamble signals transmitted from each object are "un-correlated", the energy of the estimation bias is significantly less than the energy of the desired term, $\hat{h}_1$.

II. Interference Cancellation Technique

The present interference cancellation technique removes the estimation bias without relying on the characteristics of the preamble signals transmitted from the objects. For this purpose, the preamble signaling by the objects is designed to include an orthogonal design coded modulation pattern and the receiver processing at the access point is configured to use the orthogonal design coded modulation pattern to eliminate interference.

A. Transmit Signal Description

The present interference cancellation technique uses a centralized protocol, where by design, signaling of every object is pre-defined upon network deployment. For the sake of explanation, suppose the preamble transmitted from each object is slotted into one of two distinguishable sequences, where each sequence is periodic by time duration NT, i.e., the slot period is NT, where N is the number of symbols or samples in every repetition of the pseudo random preamble sequence and T is the sample duration, and each sequence is repeated M times in every slot. It should be understood that more than two distinguishable sequences, and thus, objects, may be used, but for the sake of clarity in the present description, two sequences will be described.

The Object.1 transmission signal may be represented as $$\left[\underbrace{\bar{x}_{1(N)}, \bar{x}_{1(N)}, \ldots, \bar{x}_{1(N)}}_{M\ times}, \underbrace{-\bar{x}^*_{2(-N)}, -\bar{x}^*_{2(-N)}, \ldots, -\bar{x}^*_{2(-N)}}_{M\ times}\right] \quad \text{eq. 3}$$

where M is the number of preamble blocks transmitted, and where in the discrete time representation, every vector of the above sequence takes the following shape.

$$\bar{x}_{1(N)}=[x_1[0],x_1[1],\ldots,x_1[N-1]] \quad \text{(I)}$$

$$-\bar{x}^*_{2(-N)}=[-x^*_2[N-1],-x^*_2[N-2],\ldots,-x^*_2[0]] \quad \text{(II) eq. 4}$$

The Object.2 transmission signal may be represented as $$\left[\underbrace{\bar{x}_{2(N)}, \bar{x}_{2(N)}, \ldots, \bar{x}_{2(N)}}_{M\ times}, \underbrace{-\bar{x}^*_{1(-N)}, -\bar{x}^*_{1(-N)}, \ldots, -\bar{x}^*_{1(-N)}}_{M\ times}\right] \quad \text{eq. 5}$$

where in the discrete time representation, every vector of the above sequence takes the following shape.

$$\bar{x}_{2(N)}=[x_2[0],x_2[1],\ldots,x_2[N-1]] \quad \text{(I)}$$

$$-\bar{x}^*_{1(-N)}=[-x^*_1[N-1],-x^*_1[N-2],\ldots,-x^*_1[0]] \quad \text{(II) eq. 6}$$

Thus, the transmission signals from Object.1 and Object.2 are pre-defined messages that may be transmitted as preamble messages and that include orthogonal design coded modulation patterns using time multiplexing. The network deployer may assign the pre-defined sequences to Object.1 and Object.2 in the centralized design scheme. If additional objects are included, the network deployer may assign the pre-defined orthogonal design coded modulation patterns for each of the objects used.

B. Receive Signal Representation

At the access point, i.e., receiver 110, the time is slotted between two slots of duration M'NT, where T is the sample duration, N is the number of samples in every repetition of the pseudo random preamble sequence, and thus, NT is the slot period, and M' is the number of preamble blocks processed in each slot, noting that M'<M. Block averaging will be performed within two separate buffers, each assigned to each of the latter slots.

In the absence of carrier frequency offset (CFO) between the front circuits of the objects and the access point, the receive signal in the 1st slot can be expressed as follows.

$$\bar{y}_1 = \underbrace{F^H\Theta_1 Fh_1}_{X_1} + \underbrace{F^H\Theta_2 e^{j\Psi_2}Fh_2}_{X_1} + n_1 \quad \text{eq. 7}$$

Also, the receive signal in the 2nd slot can be expressed as follows.

$$\bar{y}_2 = \underbrace{F^H\Theta^*_2 Fh_1}_{-X^*_2} + \underbrace{F^H\Theta^*_1 e^{j\Psi_2}Fh_2}_{-X^*_1} + n_2 \quad \text{eq. 8}$$

It should be noted that the term $e^{j\Psi_2}$ represents a diagonal matrix with diagonal elements that shape a phase ramp, where $$\Psi_2 = \frac{-2\pi\ell}{F_s}[0, 1, 2, \ldots, N-1], \quad \text{eq. 9}$$

where $F_s$ is the sampling rate and l is the number of sample difference between the propagation delay of Object.2 channel to the access point compared to that of the Object.1 channel, modulo the slot period, N. Since block level synchronization is not required while applying the present interference cancellation technique, the received signal from Object.2 to the access point has equivalent of l T delay in time compared to that of the Object.1. In the frequency domain representation, this delay, modulo the periodicity of the preamble blocks in each slot, NT, results in a phase difference between the interferer preamble blocks of Object.2, compared to the reference preamble blocks of Object.1.

The procedure for positioning the objects in the ranging network may be based on the time difference of arrival (TDOA) among the preambles of different objects and the few Access Points within the reachable vicinity of that object. Therefore, the modular delay difference between the preambles of different objects to each Access Point is irrelevant to the upper layer positioning algorithm.

C. Receiver Processing

In order to obtain sufficient statistics to estimate vector channel $h_1$, the receiver performs the processing stated below on the slotted received signal:

$$X^*_1\bar{y}_1 = F^H|\Theta_1|^2 Fh_1 + F^H\Theta^*_1\Theta_2 e^{j\Psi_2}Fh_2 + n'_1 \quad \text{eq. 10}$$

in the 1st slot and $$X_2\bar{y}_2 = -F^H|\Theta_2|^2 Fh_1 + F^H\Theta_2\Theta^*_1 e^{j\Psi_2}Fh_2 + n'_2 \quad \text{11}$$

in the 2nd slot. Here, $|\Theta_1|_2$ and $|\Theta_2|_2$ are diagonal matrices with the diagonal entries equal to the magnitude square of the diagonal entries of the frequency responses of the preamble sequences $\Theta_1$ and $\Theta_2$ and $n'_1$ and $n'_2$ are the equivalent noise vectors in each slot.

Using vectors introduced in equations 10-11, the receiver may form the following term to remove the interference of Object.2 on the received signal of Object.1

$$\underbrace{X^*_1\bar{y}_1 - X_2\bar{y}_2}_{Z_{12}} = F^H(|\Theta_1|^2+|\Theta_2|^2)Fh_1 + \underbrace{F^H\Theta^*_1 Fn_1 - F^H\Theta_2 Fn_2}_{n_{12}} \quad \text{eq. 12}$$

where $n_{12}$ is the equivalent noise variable after matrix multiplication and subtraction at the receiver processing stage.

Thus, it can be seen that the interference of Object.2 is removed from the observation of Object.1 channel and is absorbed in the equivalent noise vector. Therefore, an unbiased estimation of the Object.1 propagation channel can be obtained as follows.

$$\hat{h}_1 = F^H(|\Theta_1|^2+|\Theta_2|^2)^{-1}FZ_{12} \quad \text{eq. 13}$$

Note that, based on the transmit signal model formulated in equations 3-6, a similar processing to the stages discussed above can be performed to remove the interference effect of Object.1 and estimate the propagation channel of Object.2.

D. Discussion of Integration Gain and Combining Gain

As indicated in equations 3-6, the proposed preamble structure spans MFFT blocks in every time slot and therefore, the preamble duration is 2M. Based on equations 7-8, in terms of signal to noise ratio (SNR) that translates to the link budget, the maximum integration gain that can be obtained in every time slot at the receiver is 10 log(M). Thus, at this stage of the process, the proposed interference cancellation technique requires to give up half of the possible integration gain.

Nevertheless, the remainder of the receiver processing can make up for this loss of integration gain. For example, from equation 12, the equivalent signal model at the receiver after combining the two time slots results in additive SNR gain. Consequently, the net integration gain is preserved in the proposed interference cancellation technique.

III. Interference Cancellation in the Presense of Carrier Frequency Offset

The above description is based on a simplifying assumption that carrier frequency offset (CFO) is absent. This assumption leads to the received signal representations in equations 7-8. A remedy for carrier frequency offset may be contemplated. The frequency offsets between the traceable objects and the tracking devices (APs) may be compensated by an auxiliary network that is scheduled to synchronize clock phase and carrier frequencies before ranging operation begins. A master AP may be used to synchronize the timings and phases of the clocks in the baseband processing units of other (slave) APs. For example, as illustrated in FIG. 1, the receiver 110A may be a master AP for the auxiliary network. The use of such a master AP is consistent with a ranging network in order to provide accurate position location fixes. Moreover, the clock phase and carrier frequencies of all the traceable objects in an ultra-wideband (UWB) network may be synchronized periodically (e.g., every few minutes) with the clock reference of the closest slave AP. The auxiliary network may be the same UWB network that is used for ranging or may be a different network if desired. The central scheduling unit may control the ranging operation such that ranging occurs after synchronization is accomplished.

In the proposed interference cancellation technique using pre-defined orthogonal design coded modulation patterns transmitted in preamble message by the objects to be tracked, the objects are capable of sensing a beacon from the access point to start the transmission of the preamble message. At the access point, before applying the receiver processing described in equations 10-13, the time is slotted into two slot durations. Each slot spans M'block recording and averaging during preamble reception in the 1st slot and same number of block recording and averaging in the 2nd slot, noting that the size of buffers is N and M'<M.

IV. Channel Estimation Using Complex Orthogonal Design

The proposed interference cancellation technique may be employed for additional objects by maintaining the pre-defined orthogonal design coded modulation pattern between all of the objects for interference cancellation. The scalability of the present method may be readily identified and implemented in light of the present disclosure. In this section, the resemblance of the advocated vector estimation technique to a scalar version is relied upon and the generalization of the approach to higher dimensions is described using the universal complex orthogonal design theory.

Suppose that a complex orthogonal matrix of dimensions T×K is represented as $G_C$. Here, K is the number of tracked objects that transmit preambles and T is the number of time slots that the receiver collects the sequences of preambles from all tracked objects. In general, K≤T, since the code rate higher than 1 is not trivial.

The receiver front equation may be formulated as $$[Y]_T = [G_C]_{T \times K} [h]_K + N \qquad \text{eq. 14}$$

where $[Y]_T$ is the received waveform in T time slots and $[h]_K$ is the matrix of time domain channel vectors for K tracked objects and N is white noise.

The receiver process decomposes the estimated channels from different tracked objects as per the following processing step:

$$[G_C]_{T \times K}^H [Y]_T = F^H(|\Theta_1|^2 + |\Theta_2|^2 + \ldots + |\Theta_K|^2) F[h]_K + N' \qquad \text{eq. 15}$$

where $^H$ denotes complex conjugate operation and N' is the equivalent noise process.

An example with two tracked objects is described as follows:

At the receiver front, the reception of the preamble blocks from two tracked objects in two time slots (rate 1 code) is modeled using a complex orthogonal design matrix:

$$\begin{bmatrix} [Y_1] \\ [Y_2] \end{bmatrix} = \begin{bmatrix} [X_1] & [X_2] \\ [X_2^*] & [X_1^*] \end{bmatrix} \begin{bmatrix} [h_1] \\ [h_2] \end{bmatrix} + N. \qquad \text{eq. 16}$$

Wherein operator [•] represents a matrix block to be treated as scalar in matrix multiplication.

The receiver estimation process decomposes the two tracked objects' channels using the corresponding complement complex orthogonal design matrix in the following shape:

$$\begin{bmatrix} [X_1^*] & [-X_2] \\ [X_2^*] & [X_1] \end{bmatrix} \begin{bmatrix} [Y_1] \\ [Y_2] \end{bmatrix} = F^H(|\Theta_1|^2 + |\Theta_2|^2) F \begin{bmatrix} [h_1] \\ [h_2] \end{bmatrix} + N'. \qquad \text{eq. 17}$$

An example with four tracked objects is described as follows:

At the receiver front, the reception of the preamble blocks from four tracked objects in eight time slots (rate ½ code) may be modeled using a complex orthogonal design matrix as follows.

$$\begin{bmatrix} [Y_1] \\ [Y_2] \\ [Y_3] \\ [Y_1] \\ [Y_4] \\ [Y_5] \\ [Y_6] \\ [Y_7] \\ [Y_8] \end{bmatrix} = \begin{bmatrix} [X_1] & [X_2] & [X_3] & [X_4] \\ [-X_2] & [X_1] & [-X_4] & [X_3] \\ [-X_3] & [X_4] & [X_1] & [-X_2] \\ [-X_4] & [-X_3] & [X_2] & [X_1] \\ [X_1^*] & [X_2^*] & [X_3^*] & [X_4^*] \\ [-X_2^*] & [X_1^*] & [-X_4^*] & [X_3^*] \\ [-X_3^*] & [X_4^*] & [X_1^*] & [-X_2^*] \\ [-X_4^*] & [-X_3^*] & [X_2^*] & [X_1^*] \end{bmatrix} \begin{bmatrix} [h_1] \\ [h_2] \\ [h_3] \\ [h_4] \end{bmatrix} + N. \qquad \text{eq. 18}$$

The receiver estimation process may decompose the four tracked objects' channels using the corresponding complement complex orthogonal design matrix in the following shape:

$$\begin{bmatrix} [X_1^*] & [-X_2^*] & [-X_3^*] & [-X_4^*] & [X_1] & [-X_2] & [-X_3] & [-X_4] \\ [X_2^*] & [X_1^*] & [X_4^*] & [-X_3^*] & [X_2] & [X_1] & [X_4] & [-X_3] \\ [X_3^*] & [-X_4^*] & [X_1^*] & [X_2^*] & [X_3] & [-X_4] & [X_1] & [X_2] \\ [X_4^*] & [X_3^*] & [-X_2^*] & [X_1^*] & [X_4] & [X_3] & [-X_2] & [X_1] \end{bmatrix} \qquad \text{eq. 19}$$

$$\begin{bmatrix} [Y_1] \\ [Y_2] \\ [Y_3] \\ [Y_1] \\ [Y_4] \\ [Y_5] \\ [Y_6] \\ [Y_7] \\ [Y_8] \end{bmatrix} = F^H(|\Theta_1|^2 + |\Theta_2|^2 + |\Theta_3|^2 + |\Theta_4|^2)F\begin{bmatrix} [h_1] \\ [h_2] \\ [h_3] \\ [h_4] \end{bmatrix} + N'$$

The estimation method described herein is not the only way to estimate the channel. Upon use of a preamble structure such as that described herein, any other estimation technique can be utilized. For example, after the orthogonal design processing at the receiver, estimation based on the cross correlation of the received signal with the underlying preamble sequence corresponding to every user can be applied. Therefore, the application of this approach particularly with the proposed class of preamble structure does not depend on the implementation method of the estimation part.

Figure 2:
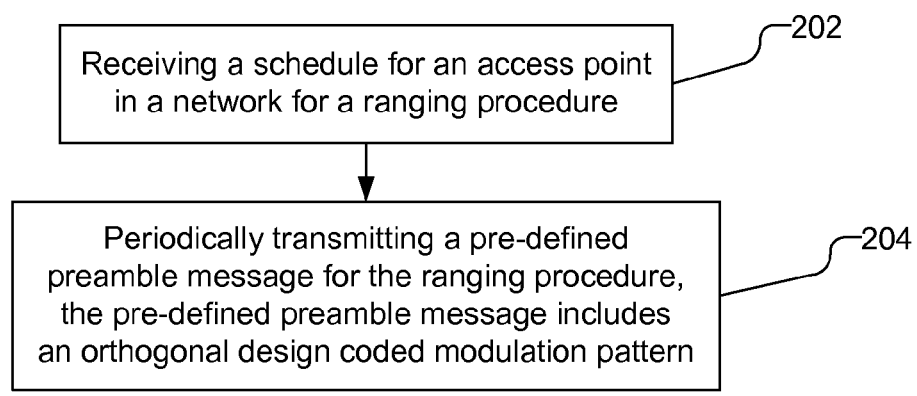
FIG. 2 is a flow chart illustrating a method performed by an object to periodically transmit a pre-defined preamble message that includes an orthogonal design coded modulation pattern.

FIG. 2 is a flow chart illustrating a method performed by an object 100 to be tracked. As can be seen, a schedule for an access point in a network is received for a ranging procedure (202). The schedule may be received, e.g., from a master access point in an auxiliary network, such as receiver 110A in FIG. 1, to synchronize the synchronize clock phase and carrier frequencies, of objects to be tracked. A pre-defined preamble message for the ranging procedure is periodically transmitted, the pre-defined preamble message includes an orthogonal design coded modulation pattern (204). The object 100 may synchronize with the network that includes the at least one access point using the schedule to periodically transmit the pre-defined preamble message that includes the orthogonal design coded modulation pattern. By way of example, the object 100 may synchronize with the network prior to periodically transmitting the pre-defined preamble message that includes the orthogonal design coded modulation pattern. If desired, the object 100 may transmit the pre-defined preamble message at a first periodicity prior to synchronizing in the network and transmit the pre-defined preamble message at a second periodicity that is less than the first periodicity after synchronizing in the network.

In one embodiment, a plurality of objects to be tracked (transmitters) may send low power preamble signals periodically (update rate depending on their battery type) and the receiver can detect them without even sending a request to them. This emission can be continuous with an arbitrary frequency (wait time), or it can be linked to the mobility of the object to be tracked. Moreover, each transmitter may send the receiver the identifier (ID) of the preamble code it is using. The ID may be transmitted by the transmitter (object to be tracked) to the receiver (access point) during the synchronization stage in the auxiliary network where the carrier frequency offset is compensated. Thus, at the network deployment stage, the preamble code ID does not need to be hard coded. In one implementation, the access point may send a set of permissible IDs to the tracked objects and the tracked objects may select an ID from that set and wait for the acknowledgement from the access point. In another implementation, the set of admissible IDs may be predefined at the network deployment stage. The transmitter may select a preamble ID in any desired manner, e.g., randomly. The transmitter may provide the preamble ID while transmitting the preamble message. If a receiver is ranging a transmitter with a particular preamble code ID, the receiver will not accept any other transmitters with the same ID at the same time. If the transmitter does not receive an appropriate acknowledgement from a receiver, the transmitter may change its preamble code ID, e.g., randomly or incrementally, and again wait for acknowledgement from the receiver. Therefore, each tracked object may choose an ID, e.g., randomly, and communicate it to the access points in their vicinity and wait for acknowledgement. Other implementation of this concept may exist.

Figure 3:
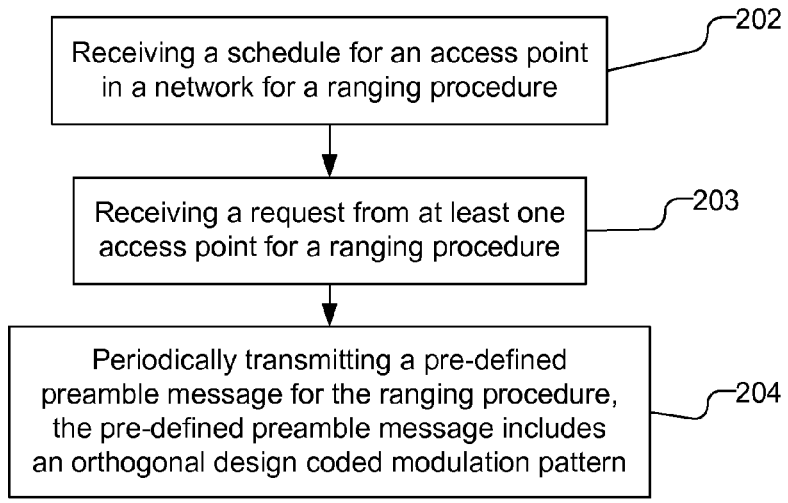
FIG. 3 illustrates another flow chart illustrating a method, similar to that shown in FIG. 2, but including synchronizing with the network.

FIG. 3 illustrates another flow chart illustrating a method performed by the objects 100, which is similar to that described in FIG. 2, like designated blocks being the same. As can be seen in FIG. 3, the object 100 may receive a request from at least one access point for the ranging procedure (203). The request may be in the form of a beacon from the at least one access point.

Thus, it is not necessary for the application of this approach that the ranging preambles are emitted in response to a ranging request. In an embodiment of this method, ranging preambles may be sent periodically, or in alternation with the synchronization preambles and the central network can decide when and how to use the received data at the access points, whether for ranging or synchronization.

Figure 4:
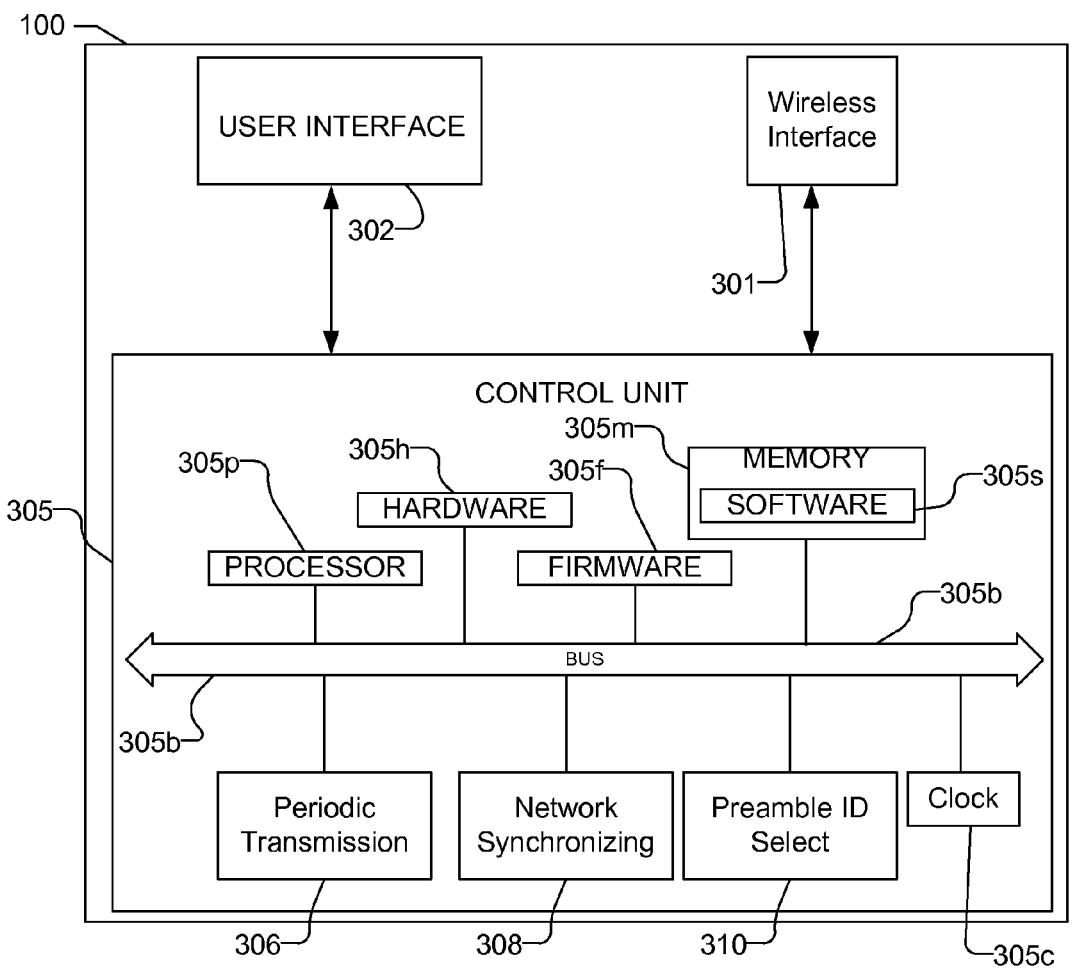
FIG. 4 is a block diagram of an object capable periodically transmitting a pre-defined preamble message that includes an orthogonal design coded modulation pattern in response to the request for a ranging procedure received from an access point.

FIG. 4 is a block diagram of an object 100 capable periodically transmitting a pre-defined preamble message that includes an orthogonal design coded modulation pattern in response to the request for a ranging procedure received from an access point. As illustrated, the object 100 includes a wireless interface 301 with which the object 100 may receive a request for a ranging procedure from an access point and may transmit the pre-defined preamble message that includes an orthogonal design coded modulation pattern. The object 100 may include additional elements, such as a user interface 302 that may include e.g., a keypad or other input device through which the user can control the object 100, as well as a display if desired.

The wireless interface 301, by way of example, may be an interface with one or more of any various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth® network, an IEEE 802.15x, or some other type of network. Moreover, any combination of WWAN, WLAN and/or WPAN may be used.

The object 100 also includes a control unit 305 that is connected to and communicates with the wireless interface 301 to receive the request for the ranging procedure from an access point and in response cause the wireless interface 301 to transmit the pre-defined preamble message that includes an orthogonal design coded modulation pattern. The control unit 305 may be provided by a bus 305b, clock 305c, processor 305p and associated memory 305m, hardware 305h, firmware 305f, and software 305s. The control unit 305 includes a periodic transmission module 306 that causes the wireless interface 301 to periodically transmit the pre-defined preamble message that includes the orthogonal design coded modulation pattern in response to receiving the request for ranging. The pre-defined preamble message with the orthogonal design coded modulation pattern may be previously received, e.g., during deployment of the system, e.g., from the access point and may be stored in memory 305m. The control unit 305 may further include a network synchronizing module 308 that synchronizes with the network to periodically transmitting the pre-defined preamble message that includes the orthogonal design coded modulation pattern. The control unit 305 may further include a preamble ID selecting module 310 that selects a preamble ID and associated pre-defined preamble message from a plurality of preamble IDs received from an access point, e.g., in an auxiliary network, via wireless interface 301, and, if desired, to select a new preamble ID if acknowledgement is not received.

The periodic transmission module 306, synchronizing module 308, and preamble ID selecting module 310 are illustrated separately from processor 305p for clarity, but may be part of the processor 305p or implemented in the processor based on instructions in the software 305s which is run in the processor 305p. It will be understood as used herein that the processor 305p can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile device, and is not to be limited to any particular type of memory or number of memories, or type of media upon which memory is stored.

The methodologies described herein may be implemented by various means depending upon the application. For example, these methodologies may be implemented in hardware 305h, firmware 305f, software 305s, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 305m and executed by the processor 305p. Memory 305m may be implemented within or external to the processor 305p. If implemented in firmware and/or software, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Thus, the object 100 may include a means for receiving a schedule for an access point in a network for a ranging procedure, which may be, e.g., the wireless interface 301. The object may further include a means for means for periodically transmitting a pre-defined preamble message for the ranging procedure, the pre-defined preamble message includes an orthogonal design coded modulation pattern, which may be, e.g., the periodic transmission module 306, as well as the clock 305c, and memory 305m, which may store the pre-defined preamble message that includes an orthogonal design coded modulation pattern, and the wireless interface 301. The object 100 may further include means for receiving a request from at least one access point for the ranging procedure before periodically transmitting the pre-defined preamble message, which may be, e.g., the wireless interface 301. The object 100 may further include a means for receiving a plurality of preamble identifiers from the access point, which may be, e.g., the wireless interface 301; means for selecting a preamble identifier which may be, e.g., preamble ID selecting module 310, and means for transmitting the preamble identifier with the pre-defined preamble message, which may be, e.g., the wireless interface 301. The object 100 may further include a means for synchronizing in a network that includes the at least one access point using the schedule to periodically transmit the pre-defined preamble message that includes the orthogonal design coded modulation pattern, which may be, e.g., the network synchronizing module 308.

Figure 5A:
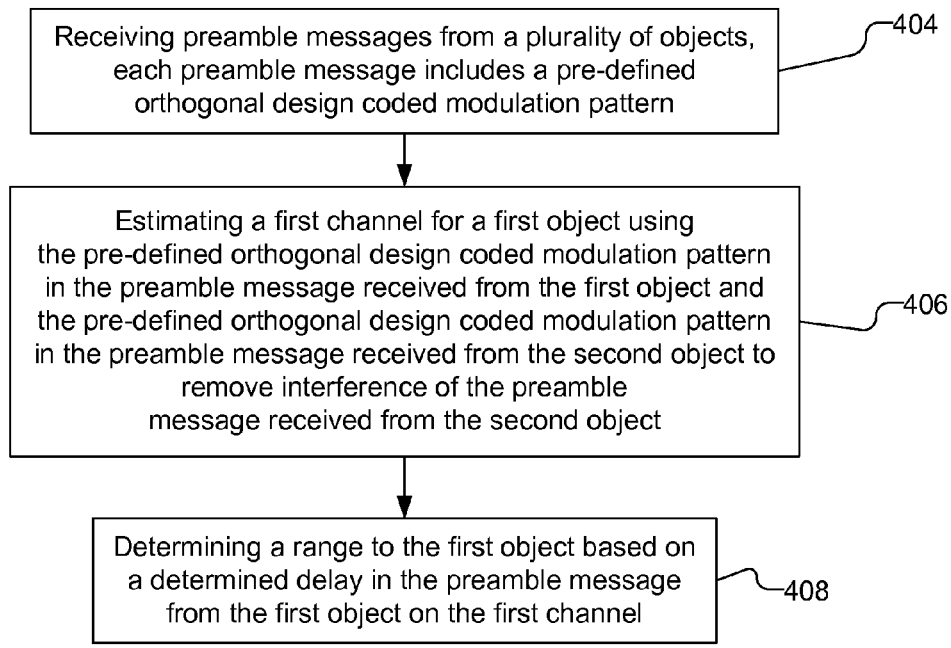
FIGS. 5A and 5B are flow charts illustrating methods performed by a receiver to perform a ranging procedure with interference cancellation.

FIG. 5A is a flow chart illustrating a method performed by the receiver 110 to perform a ranging procedure with interference cancellation. As illustrated preamble messages from a plurality of objects are received, where each preamble message includes a pre-defined orthogonal design coded modulation pattern (404). The preamble messages received from the plurality of objects may have the same frequency. The preamble message may be repeated so that the boundary of the preamble may be accurately found and the sequence of the preamble is used to estimate the channel. A first channel for a first object is estimated using the pre-defined orthogonal design coded modulation pattern in the preamble message received from the first object and the pre-defined orthogonal design coded modulation pattern in the preamble message received from the second object to remove interference of the preamble message received from the second object (406). A range to the first object is determined based on a determined delay in the preamble message from the first object on the first channel (408). A channel for a second object may also be estimated. For example, a second channel for the second object may be estimated using the pre-defined orthogonal design coded modulation pattern in the preamble message received from the second object and the pre-defined orthogonal design coded modulation pattern in the preamble message received from the first object to remove interference of the preamble message received from the first object. A second range to the second object may be determined based on a determined second delay in the preamble message from the second object on the second channel. Multiple ranges to the first object may be determined from multiple access points each having known positions using delays in the preamble message from the first object on the first channel. The multiple ranges and known positions of each of the multiple access points may be used to determine a position of the first object, e.g., using trilateration.

Figure 5B:
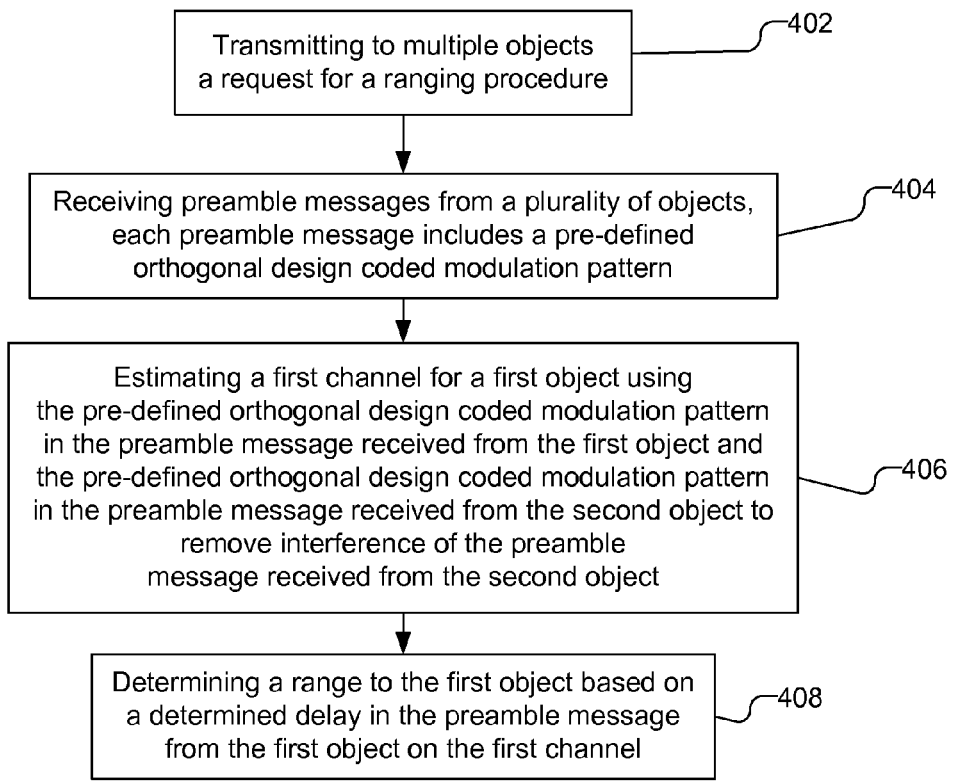

FIG. 5B is a flow chart illustrating a method performed by the receiver 110 to perform a ranging procedure with interference cancellation that is similar to the method illustrated in FIG. 5A, like designated elements being the same. As illustrated in FIG. 5B, prior to steps 404, 406, and 408, a request for a ranging procedure may be transmitted to multiple objects (402), where the preamble messages from the plurality of objects are transmitted in response to the request for the ranging procedure. The request for the ranging procedure may be transmitted in a beacon. As discussed above, however, it is not necessary for the application of this approach that the ranging preambles are emitted in response to a ranging request. In an embodiment of this method, ranging preambles may be sent periodically, or in alternation with the synchronization preambles and the central network can decide when and how to use the received data at the access points, whether for ranging or synchronization.

Figure 6:
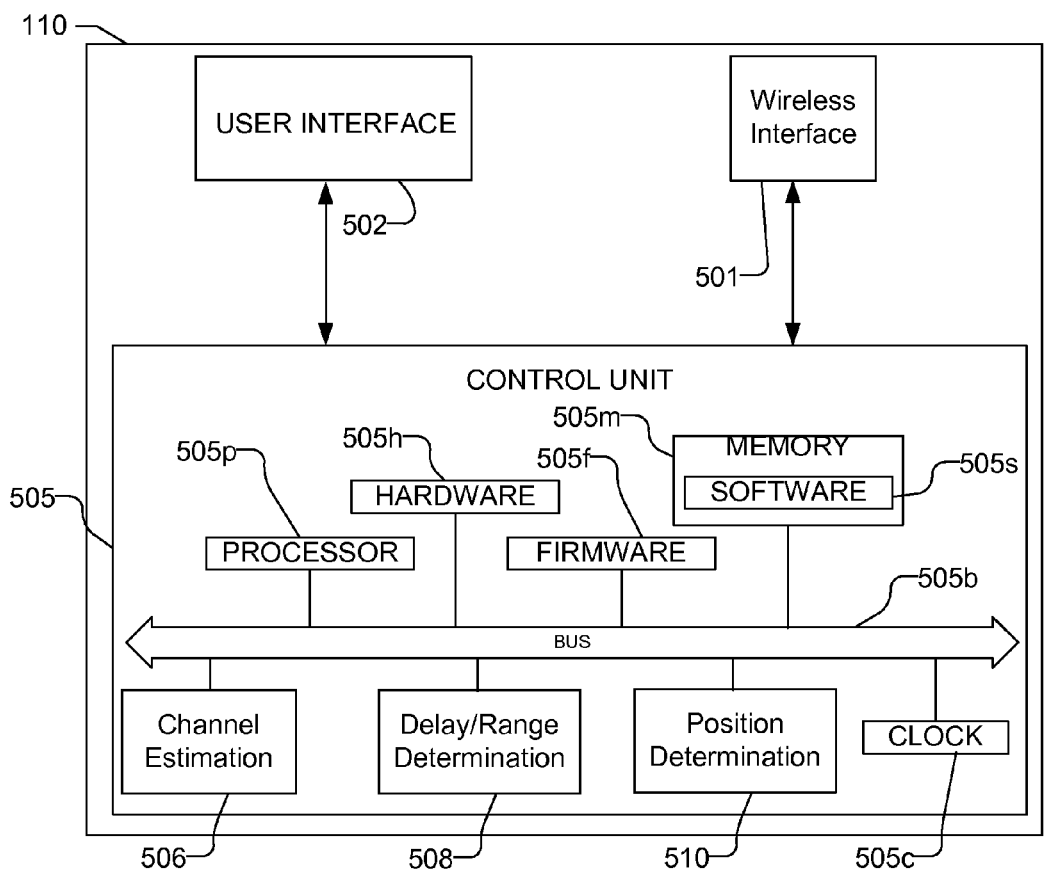
FIG. 6 is a block diagram of a receiver capable of performing a ranging procedure with interference cancellation as discussed above.

FIG. 6 is a block diagram of a receiver 110 capable of performing a ranging procedure with interference cancellation as discussed above. As illustrated, the receiver 110 includes a wireless interface 501 with which the receiver 110 may transmit a request for a ranging procedure to a plurality of objects 100 to be tracked, and may receive in response pre-defined preamble messages that include orthogonal design coded modulation patterns from the objects 110. The receiver 110 may include additional elements, such as a user interface 502 that may include e.g., a keypad or other input device through which the user can control the receiver 110, as well as a display if desired.

As discussed above, the wireless interface 501, by way of example, may be an interface with one or more of any various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth® network, an IEEE 802.15x, or some other type of network. Moreover, any combination of WWAN, WLAN and/or WPAN may be used.

The receiver 110 also includes a control unit 505 that is connected to and communicates with the wireless interface 501 to cause the wireless interface 501 to transmit the request for the ranging procedure and receive pre-defined preamble messages that includes an orthogonal design coded modulation pattern in response. The control unit 505 may be provided by a bus 505$b$, clock 505$c$, processor 505$p$ and associated memory 505$m$, hardware 505$h$, firmware 505$f$, and software 505$s$. The control unit 505 includes a channel estimation module 506 that estimates the channel of an object 100 using the pre-defined orthogonal design coded modulation patterns in the received preamble messages to remove interference caused by preamble messages received from other objects, as discussed above. A delay/range estimation module 508 may determine the delay in the preamble message from the object on estimated channel to determine a range to the object. Additionally, a position determination module 510 may be present to estimate the position of the object based on the determined range, as well as additional ranges to the object from other receivers, e.g., access points, which may be received, e.g., via wireless interface, or a wired interface. The position determination module 510 may determine the position of the object, e.g., using trilateration based on the determined ranges and known positions of the receivers. If desired, position determination for the object may be performed in a remote server, where receiver 110 provides the determined range to the remote server.

The channel estimation module 506, delay/range determination 508, and position determination module 510 are illustrated separately from processor 505$p$ for clarity, but may be part of the processor 505$p$ or implemented in the processor based on instructions in the software 505$s$ which is run in the processor 505$p$. It will be understood as used herein that the processor 505$p$ can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile device, and is not to be limited to any particular type of memory or number of memories, or type of media upon which memory is stored.

The methodologies described herein may be implemented by various means depending upon the application. For example, these methodologies may be implemented in hardware 505$h$, firmware 505$f$, software 505$s$, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 505$m$ and executed by the processor 505p. Memory 505m may be implemented within or external to the processor 505p. If implemented in firmware and/or software, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Thus, the receiver 110 may include means for receiving preamble messages from a plurality of objects, each preamble message includes a pre-defined orthogonal design coded modulation pattern, which may be, e.g., the wireless interface 501. The receiver 110 may include means for estimating a first channel for a first object using the pre-defined orthogonal design coded modulation pattern in the preamble message received from the first object and the pre-defined orthogonal design coded modulation pattern in the preamble message received from the second object to remove interference of the preamble message received from the second object, which may be, e.g., the channel estimation module 506. A means for determining a delay in the preamble message from the first object on the first channel to determine a range to the first object may be, e.g., the delay/range determination module. The receiver 110 may further include means for estimating a second channel for the second object using the pre-defined orthogonal design coded modulation pattern in the preamble message received from the second object and the pre-defined orthogonal design coded modulation pattern in the preamble message received from the first object to remove interference of the preamble message received from the first object, which may be the channel estimation module 506. A means for determining a second delay in the preamble message from the second object on the second channel to determine a second range to the second object may be, e.g., the delay/range determination module 508. The receiver 110 may further include means for determining a position of the first object using the first range and the multiple ranges and the known position of the first access point and the known positions of each of the multiple access points, which may be the position determination module 510. The receiver 110 may include a means for transmitting a request for a ranging procedure to multiple objects, which may be, e.g., the wireless interface 501.

Although various aspects of the invention are illustrated in connection with specific embodiments for instructional purposes, various aspects of the invention are not limited thereto. Various adaptations and modifications may be made without departing from the scope of the invention. Therefore, the spirit and scope of the appended claims should not be limited to the foregoing description

What is claimed is:

1. A method for performing a ranging procedure with interference cancellation, the method comprising:
   receiving preamble messages from a plurality of objects, each preamble message includes a pre-defined orthogonal design coded modulation pattern;
   estimating a first channel for a first object using the pre-defined orthogonal design coded modulation pattern in the preamble message received from the first object and the pre-defined orthogonal design coded modulation pattern in the preamble message received from a second object to remove interference of the preamble message received from the second object; and
   determining a range to the first object based on a determined delay in the preamble messages from the first object on the first channel.

2. The method of claim 1, further comprising:
   estimating a second channel for the second object using the pre-defined orthogonal design coded modulation pattern in the preamble message received from the second object and the pre-defined orthogonal design coded modulation pattern in the preamble message received from the first object to remove interference of the preamble message received from the first object; and
   determining a second range to the second object based on a determined second delay in the preamble message from the second object on the second channel.

3. The method of claim 1, wherein the range is a first range to a first access point having a known position, the method further comprising:
   determining multiple ranges to the first object from multiple access points each having known positions using delays in the preamble message from the first object on the first channel; and
   determining a position of the first object using the first range and the multiple ranges and the known position of the first access point and the known positions of each of the multiple access points.

4. The method of claim 1, wherein the preamble messages received from the plurality of objects have the same frequency.

5. The method of claim 1, wherein the plurality of objects comprises more than two objects.

6. The method of claim 1, further comprising transmitting a request for a ranging procedure to multiple objects, wherein the preamble messages from the plurality of objects are transmitted in response to the request for the ranging procedure.

7. The method of claim 6, wherein the request for the ranging procedure is transmitted in a beacon.

8. An apparatus capable of performing a ranging procedure with interference cancellation, the apparatus comprising:
   a wireless interface configured to transmit to and receive signals from multiple objects;
   a processor coupled to control the wireless interface, the processor configured to receive through the wireless interface preamble messages from a plurality of objects, each preamble message includes a pre-defined orthogonal design coded modulation pattern, estimate a first channel for a first object using the pre-defined orthogonal design coded modulation pattern in the preamble message received from the first object and the pre-defined orthogonal design coded modulation pattern in the preamble message received from a second object to remove interference of the preamble message received from the second object, and determine a range to the first object based on a determined delay in the preamble message from the first object on the first channel.

9. The apparatus of claim 8, wherein the processor is further configured to:
estimate a second channel for the second object using the pre-defined orthogonal design coded modulation pattern in the preamble message received from the second object and the pre-defined orthogonal design coded modulation pattern in the preamble message received from the first object to remove interference of the preamble message received from the first object; and
determine a second range to the second object based on a determined second delay in the preamble message from the second object on the second channel.

10. The apparatus of claim 8, wherein the range is a first range to a first access point having a known position, and wherein the processor is further configured to:
determine multiple ranges to the first object from multiple access points each having known positions using delays in the preamble message from the first object on the first channel; and
determine a position of the first object using the first range and the multiple ranges and the known position of the first access point and the known positions of each of the multiple access points.

11. The apparatus of claim 8, wherein the preamble messages received from the plurality of objects have the same frequency.

12. The apparatus of claim 8, wherein the plurality of objects comprises more than two objects.

13. The apparatus of claim 8, wherein the processor is further configured to cause the wireless interface to transmit a request for a ranging procedure to multiple objects, wherein the preamble messages from the plurality of objects are transmitted in response to the request for the ranging procedure.

14. The apparatus of claim 13, wherein the request for the ranging procedure is transmitted in a beacon.

15. A method for transmitting a pre-defined preamble message, the method comprising:
receiving with a wireless interface a schedule for an access point in a network for a ranging procedure; and
periodically transmitting with the wireless interface the pre-defined preamble message for the ranging procedure, the pre-defined preamble message includes an orthogonal design coded modulation pattern.

16. The method of claim 15, further comprising receiving a request from at least one access point for the ranging procedure before periodically transmitting the pre-defined preamble message.

17. The method of claim 16, wherein the request is in a beacon from the at least one access point.

18. The method of claim 15, further comprising:
receiving a plurality of preamble identifiers from the access point;
selecting a preamble identifier; and
transmitting the preamble identifier with the pre-defined preamble message.

19. The method of claim 15, further comprising synchronizing in the network that includes the access point using the schedule to periodically transmit the pre-defined preamble message that includes the orthogonal design coded modulation pattern.

20. The method of claim 19, wherein synchronizing in the network is performed prior to periodically transmitting the pre-defined preamble message that includes the orthogonal design coded modulation pattern.

21. The method of claim 19, wherein periodically transmitting the predefined preamble message that includes the orthogonal design coded modulation pattern comprises:
transmitting the pre-defined preamble message at a first periodicity prior to synchronizing in the network; and
transmitting the pre-defined preamble message at a second periodicity that is less than the first periodicity after synchronizing in the network.

22. An apparatus capable of transmitting a pre-defined preamble message, the apparatus comprising:
a wireless interface configured to transmit to and receive signals from access points;
a processor coupled to control the wireless interface, the processor configured to receive through the wireless interface a schedule for an access point in a network for a ranging procedure; and to cause the wireless interface to periodically transmit the pre-defined preamble message for the ranging procedure, the pre-defined preamble message includes an orthogonal design coded modulation pattern.

23. The apparatus of claim 22, wherein the processor is further configured to receive a request from at least one access point for a ranging procedure.

24. The apparatus of claim 23, wherein the request is in a beacon from the at least one access point.

25. The apparatus of claim 22, wherein the processor is further configured to:
receive a plurality of preamble identifiers from the access point with the wireless interface;
select a preamble identifier; and
cause the wireless interface to transmit the preamble identifier with the pre-defined preamble message.

26. The apparatus of claim 22, wherein the processor is further configured to synchronize in the network that includes the access point using the schedule to periodically transmit the pre-defined preamble message that includes the orthogonal design coded modulation pattern.

27. The apparatus of claim 26, wherein the processor is configured to synchronize in the network prior to periodically transmitting the pre-defined preamble message that includes the orthogonal design coded modulation pattern.

28. The apparatus of claim 26, wherein the processor is configured to cause the wireless interface to periodically transmit the pre-defined preamble message that includes the orthogonal design coded modulation pattern by being configured to:
transmit the pre-defined preamble message at a first periodicity prior to synchronizing in the network; and
transmit the pre-defined preamble message at a second periodicity that is less than the first periodicity after synchronizing in the network.

* * * * *